3,026,278
CYANOALKYLSILOXANE COPOLYMERS

Richard K. Walton, North Plainfield, Ralph F. Sellers, Middlebush, and William G. Colclough, Jr., Somerville, N.J., assignors to Union Carbide Corporation, a corporation of New York
No Drawing. Filed Nov. 29, 1957, Ser. No. 699,490
14 Claims. (Cl. 260—18)

This invention relates to new organopolysiloxanes and to processes for their production. More particularly, this invention is concerned with cyanoalkylsiloxane copolymers as new compositions of matter, to processes for producing same, and to molding compositions and laminates prepared therefrom.

The thermosetting organopolysiloxanes widely employed in industry are characterized by a network of recurring siloxane units in which each silicon atom usually contains at least one pendant hydrocarbon group, as for example, a methyl, ethyl or phenyl group. Such organopolysiloxanes have heretofore been prepared mainly by the hydrolysis and partial condensation of trifunctional hydrocarbon silanes, or mixtures of such trifunctional hydrocarbon silanes, with difunctional hydrocarbon silanes. Occasionally a small amount of a monofunctional silane is also added as a chain end-blocking compound to keep the molecular weight of the produced polysiloxane within desired limits. In addition, a small amount of a tetrafunctional silane such as silicon tetrachloride or tetraethyl silicate can be added to increase the functionality of the resin by supplying more points at which cross-linking can occur. Generally, these tetrafunctional modifiers are added in quantities not exceeding about 5 mole percent of the total silane mixture.

Thermosetting organopolysiloxanes of the type described have been employed in coatings, in laminating varnishes and in molding compositions. Although they possess many desirable properties, they have not been found entirely satisfactory in all of the above applications. By way of illustration, when employed in molding compositions, such organopolysiloxanes do not cure or thermoset to a satisfactory rigidity and strength within a reasonable time under the temperature and pressure conditions normally employed by the molder, so that many articles molded therefrom cannot be removed without distortion or fracture of the article from the mold while still hot, i.e., as soon as the molding cycle is complete. In complex pieces the molded article may actually break apart when the mold is opened with part of the molded article sticking to the mold force and the remainder staying in the mold cavity. Examination of specimens in which this has occurred has shown that the article has a somewhat "cheesy" appearance at this stage, and that failure was apparently of a tearing type due to the inadequate cohesive strength of the organopolysiloxane. Attempts to obtain higher hot strength via a longer cure time and/or higher cure temperatures in the mold result in excessive embrittlement of the cured composition with the result that the molded article is then more prone to cracking or brittle fracture either when the mold is opened or during ejection of the article from the mold. One proposal, the use of release agents or lubricants, has shown a small degree of improvement in simple moldings, but the improvement has not been sufficient to prevent cracking or breaking when more intricately shaped articles are molded. The amount of lubricant generally necessary to effect any significant improvement in the mold release characteristics is usually so large that it deleteriously affects the mechanical and electrical properties of the molding and occasionally even results in "blush-out."

The present invention is based on our discovery that a class of thermosetting organopolysiloxanes produced by the cohydrolysis of hydrolyzable hydrocarbon silanes and hydrolyzable cyanoalkyl silanes are faster curing than previously known organopolysiloxanes, and that molding compositions containing such copolymers cure more rapidly and develop sufficient hot strength while within the mold so that articles molded therefrom can be ejected from the mold, while still hot, without deformation or cracking.

The thermosetting organosiloxane copolymers of this invention may be produced by the cohydrolysis of a mixture of one or more hydrolyzable hydrocarbon silanes with one or more hydrolyzable cyanoalkyl silanes followed by the condensation of the cohydrolysis product to produce a stable, hydroxyl-containing cyanoalkyl organosiloxane copolymer, which can be further processed and cured.

The cyanoalkyl organosiloxane copolymers of this invention contain units which may be represented by the following formulae:

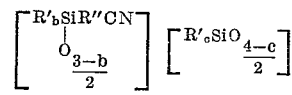

wherein $R'$ represents a hydrocarbon radical such as an alkyl radical containing from 1 to about 5 carbon atoms, for example, methyl, ethyl, butyl and the like, or an aryl radical such as phenyl, or an alkaryl radical such as tolyl, or an aralkyl radical such as benzyl or phenethyl, or an alicyclic radical such as cyclohexyl; $R''$ represents an alkylene radical containing from 2 to about 5 carbon atoms, preferably about 2 or 3 carbon atoms, such as ethylene or n-propylene, and wherein the cyano radical is preferably attached to the omega carbon atom relative to the silicon atom; ($b$) represents an integer having a value of 0 or 1; and ($c$) represents an integer having a value of from 0 to 3. These copolymers also contain a number of silanic hydroxyl groups (not shown) randomly scattered along the copolymer chain which on heating condense with each other to form cross-links between the respective silicon atoms to which they are attached, and thus produce insoluble, infusible, resinous products containing structural units having the same formulae as shown above, but containing fewer silanic hydroxyl groups.

The hydrolyzable cyanoalkyl silanes suitable for use as starting materials may be represented by the empirical formula:

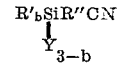

wherein $R'$, $R''$ and ($b$) have the same meanings as hereinbefore indicated, and $Y$ is an easily hydrolyzable radical such as an halogen atom such as chlorine, bromine or fluorine, or an alkoxy radical preferably having from about 2 to about 4 carbon atoms such as ethoxy, or an aryloxy radical such as phenoxy.

Illustrative of cyanoalkyl silanes suitable for use in this invention are beta-cyanoethyltrichlorosilane, gamma-cyanopropyltrichlorosilane, delta-cyanobutyltrichlorosilane, beta-cyanoethyltriethoxysilane, gamma-cyanopropyltriethoxysilane, beta-cyanoethylmethyldichlorosilane, gamma-cyanopropylmethyldiethoxysilane, and the like, as well as mixtures thereof.

The hydrolyzable hydrocarbon silanes suitable for use in our invention may be represented by the formula:

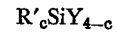

wherein $R'$, $Y$ and ($c$) have the same meanings as hereinbefore stated. Illustrative of the hydrocarbon silanes suitable for use in this invention are methyltrichlorosilane, ethyltrichlorosilane, phenethyltrichlorosilane, dimethyldichlorosilane, phenyltrichlorosilane, diphenyldichlorosilane, methylphenyldichlorosilane, methyltriethoxysilane, dimethyldiethoxysilane, phenyltriethoxysilane, diphenyldiethoxysilane, methylphenyldiethoxysilane, and methylethoxydichlorosilane, as well as mixtures thereof. The reaction mixture containing these and similar di- and tri-functional hydrocarbon silanes may be prepared from purified monomers or monomer mixtures, or from commercially available materials; and may also contain up to about 5 mole percent of monofunctional and/or tetra-functional silanes such as trimethylchlorosilane, silicon tetrachloride, and the like.

In preparing suitable mixtures of functional silanes for hydrolysis and condensation to the improved copolymers of this invention we can employ a molar ratio of hydrolyzable hydrocarbon silanes to hydrolyzable cyanoalkyl silanes such that the R″CN:Si molar ratio of the mixture is from about 0.1:1 to about 0.6:1, preferably from about 0.15:1 to about 0.45:1, and the molar ratio of the sum of R′ plus R″CN:Si in the mixture varies within the range of from about 0.95:1 to about 1.5:1. Silane mixtures having an R′ plus R″CN:Si molar ratio of about 1:1 to about 1.25:1 are generally preferred for the preparation of resins intended for use in molding compositions; somewhat higher molar ratios, from about 1.15:1 to about 1.35:1 are generally preferred for resins intended for use in laminating compositions. For convenience, the R′ plus R″CN:Si molar ratio will hereinafter be referred to as R:Si.

The organosiloxane copolymers of this invention can be produced by cohydrolyzing a mixture of cyanoalkyl silanes and hydrocarbon silanes, and then partially condensing the hydrolyzate. The reactive siloxane copolymers so produced can be used directly, e.g., in coating compositions, or de-solvated as for potting or casting applications, or dissolved in organic solvents to produce varnishes, or blended with solid fillers to produce molding compositions and the like.

In one method of carrying out this invention a mixture of cyanoalkyl chlorosilanes and hydrocarbon chlorosilanes is slowly added at a temperature below about 30° C. to an agitated slurry of an acid acceptor, such as an alkali metal or alkaline earth metal carbonate or bicarbonate, suspended in an organic solvent such as ether, toluene or acetone containing a small amount, not more than about 2% by weight of water. After hydrolysis is completed the slurry is filtered to remove the insoluble inorganic salts and the cake on the filter is washed with additional fresh organic solvent. A small amount of a suitable condensation catalyst is added to the combined filtrate and washings and partial condensation is effected by heating for a short time. Finally the solvents are distilled off to yield a viscous to solid siloxane product. If desired, the solvent may be left in and the solution can be used as a varnish. Generally the total solids content in the varnish is from about 30% to about 75% by weight.

In a further embodiment of this invention the mixture of hydrolyzable hydrocarbon silanes and cyanoalkyl silanes is added at a reaction temperature below about 50° C. to a vigorously agitated two phase solvent system consisting of water and an organic solvent immiscible in water such as petroleum ether or isopropyl ether. Other water immiscible solvents, particularly those which are poor solvents for hydrochloric acid and the other hydrolysis by-products, can also be used. After completion of hydrolysis the aqueous layer, which contains the hydrolysis by-products dissolved therein, is removed and the organic solvent layer is washed several times with fresh water until free of said by-products. A small amount of a condensation catalyst is added to the hydrolyzate and the hydrolyzate mixture is partially condensed by heating. Finally the solvents are removed by distillation to yield a viscous to solid siloxane product; or the organic solvent can be left in the mixture and the solution may be used in varnish or coating compositions.

Alternatively a solution of the hydrolyzable silane compounds in an organic solvent can be used in either of the above methods; or this silane solution may be hydrolyzed by pouring it into very cold water or onto cracked ice and the hydrochloric acid or the other hydrolysis by-product is then washed out and the hydrolyzate condensed and finished as described above.

When the partial condensation is carried out in the presence of a weakly alkaline nitrogen-containing condensation catalyst the copolymer produced is a reactive, stable, low molecular weight, hydroxyl-containing copolymer. Among the catalysts that can be used are included ammonia, ammonium hydroxide, organoamines and amides. Those organoamines and amides particularly suitable as condensation catalysts include the alkylamines such as the primary alkylamines, for example, methyl-, ethyl-, propyl-, and butylamines; the secondary alkylamines, for example, dimethyl-, diethyl-, dipropyl-, and dibutylamines including the mixed secondary amines such as methylethylamine; the tertiary alkylamides, for example, trimethyl-, triethyl-, tripropyl-, and tributylamines, the primary, secondary, and tertiary hydroxyl alkylamines such as ethanolamine, diethanolamine, triisopropanolamine, and triethanolamine; the heterocyclicamines, for example, morpholine and pyridine; amides such as urea and substituted ureas; and the like.

When the partial condensation is carried out in the presence of acidic or soluble metal-containing catalysts, the reactive copolymer produced tends to have a higher molecular weight and a lower hydroxyl content. Illustrative of such catalysts are the fatty acid salts such as the stearates and octoates of calcium, zinc, cobalt and tin; weakly acidic materials such as boric acid; moderately acidic sulfonamides; and metallo-organo compounds such as dicyclopentadienyl zirconium dichloride and other ferrocene-like compounds. This partial condensation may also be catalyzed with a relatively strong base such as sodium hydroxide, magnesium oxide, barium oxide, quanidine carbonate, or the like, or it may be carried out in the absence of any added condensation catalyst to produce reactive partially condensed cyanoalkylsiloxane copolymers. However, such strongly alkaline and uncatalyzed condensations are generally more difficultly and less reliably controllable.

The cyanoalkylsiloxane copolymers of this invention and the molding compositions prepared therefrom harden and cure faster than heretofore known organosiloxane copolymers. The molding compositions also possess greater hot-strength properties and consequently molded articles can be hot-ejected from the mold without distortion, cracking or other deformation.

The cyanoalkylsiloxane copolymers of this invention may be readily compounded with fillers, pigments, cure accelerators and lubricants by any of the methods well known to those familiar with the art. Suitable molding compositions can be obtained by compounding from about 20 to about 50 parts by weight of the cyanoalkylsiloxane copolymers of this invention with from about 0.1 to about 2 parts by weight of an accelerator, from about 0.5 to about 3 parts by weight of a lubricant and from about 50 to about 80 parts by weight of a filler at about 100° C. on a two-roll mill so as to form a sheet. If desired, pigments or other heat-stable colorants may be added. The milled sheet is then granulated and the granulated material is used for molding purposes.

Among the suitable cure accelerators may be mentioned the metal salts of fatty acids such as zinc, lead, aluminum or calcium stearate, triethanolamine, diethylamine, the adduct of two moles of formaldehyde with ethylenediamine, the ethylenediamine-benzaldehyde adduct, lead oxide, barium oxide, or calcium hydroxide.

As lubricants one can use a fatty acid such as stearic, myristic and oleic acids; or the metal salts of such acids, such as the calcium, aluminum or zinc salts; or natural or synthetic waxes.

The preferred fillers are inorganic in nature and include materials such as silica, clay, diatomaceous earth, mica, asbestos, and glass fibers. Cellulosic fillers and other natural and synthetic fibers; metallic powders and fibers; alkaline earth carbonates; and the like may also be used where lesser levels of heat resistance and electrical properties are suitable.

The molding compositions so prepared may be compression or transfer molded and cured at temperatures of from about 150° C. to about 200° C. and at pressures of from about 1500 to about 15,000 p.s.i.g. in from about 3 to about 10 minutes to consistently yield molded articles which can be ejected hot from the mold without deformation or cracking even when intricately shaped articles are produced. The molded articles so obtained cool to hard, insoluble, infusible, rigid pieces and do not require any after-bake treatment to complete the curing cycle.

The following examples further illustrate the invention.

Example 1A

A 12 liter 3-necked glass flask was equipped with a stirrer, condenser and addition funnel, and then charged with 2960 g. (35.3 moles) of sodium bicarbonate and 6000 g. of methyl ethyl ketone having a water content of less than 1% by weight. A previously prepared mixture of 310 g. (2.4 moles) of dimethyldichlorosilane, 538 g. (3.6 moles) of methyltrichlorosilane, 1015 g. (4.8 moles) of phenyltrichlorosilane and 226 g. (1.2 moles) of beta-cyanoethyltrichlorosilane was slowly added below the surface of the vigorously agitated slurry of bicarbonate in ketone over a period of 2.5 hours at such a rate that the reaction temperature remained below 30° C. The R:Si ratio of the silane mixture was 1.2:1 and the R″CN:Si ratio was 0.1:1. Additional cooling of the reaction was provided by immersing the flask in a cooling bath during the addition. After addition of the silane mixture was complete, 4 ml. of water was added, and the reaction mixture was agitated for another 40 minutes; the pH was about 6.4. The slurry was filtered to remove the insoluble inorganic salts and the filter cake was washed with 1200 g. of methyl ethyl ketone. The filtrates were combined, 4 g. of triisopropanolamine was added, and the solution was concentrated by distilling off the solvents at atmospheric pressure to a final pot temperature of about 130° C. in about 2 hours. The pressure was then gradually reduced and heating was continued so that at the end of 10 minutes the pressure was 40 mm. of mercury, and the pot temperature was 130° C. The reaction mass was discharged and cooled. Yield was 1160 g. of a clear, amber, grindable resin having a nitrogen content of 1.06% by weight. At 150° C. the cyanoethylsiloxane copolymer had an "as is" hot plate gel time of more than 600 seconds; with 2% by weight of ethylenediamine-formaldehyde adduct added, the copolymer had a gel time of 65 seconds.

Example 1B

For comparison purposes an experiment was carried out substantially as described above, but in which the beta-cyanoethyltrichlorosilane was replaced by an equimolar amount of methyltrichlorosilane. The mixture of 310 g. (2.4 moles) of dimethyldichlorosilane, 718 g. (4.8 moles) of methyltrichlorosilane and 1015 g. (4.8 moles) of phenyltrichlorosilane was added below the surface of a vigorously agitated slurry of 2960 g. (35.3 moles) of sodium bicarbonate in 6000 ml. of acetone containing less than 1% water at a reaction temperature of about 30° C. over a period of 1.75 hours. The R:Si ratio was 1.2:1 and the R″CN:Si ratio was 0. Condensation and isolation were substantially as indicated above, and the final distillation conditions were 150° C. at 50 mm. of mercury. Yield was about 1000 g. of a clear, nearly water-white, grindable resin. At 150° C. the resin had an "as is" hot plate gel time in excess of 600 seconds; when catalyzed with 2% by weight of ethylenediamineformaldehyde adduct, the resin had an average gel time of about 100 seconds.

Example 2

A mixture of 310 g. (2.4 moles) of dimethyldichlorosilane, 359 g. (2.4 moles) of methyltrichlorosilane, 1015 g. (4.8 moles) of phenyltrichlorosilane and 453 g. (2.4 moles) of beta-cyanoethyltrichlorosilane was reacted in substantially the same manner as described in Example A. The R:Si ratio was 1.2:1 and the R″CN:Si ratio was 0.2:1. Yield was about 1200 g. of a clear, amber, grindable resin which analyzed for 2.4% nitrogen by weight. At 150° C. the cyanoalkylsiloxane copolymer had an "as is" hot plate gel time of over 600 seconds; when catalyzed with 2% by weight of ethylenediamineformaldehyde adduct, the copolymer had a gel time of about 33 seconds.

Example 3

A mixture of 310 g. (2.4 moles) of dimethyldichlorosilane, 359 g. (2.4 moles) of methyltrichlorosilane, 254 g. (1.2 moles) of phenyltrichlorosilane and 1130 g. (6 moles) of beta-cyanoethyltrichlorosilane was reacted in substantially the same manner as described in Example 1A, except that the triisopropanolamine was omitted from the partial condensation step. The R:Si ratio was 1.2:1 and the R″CN:Si ratio was 0.5:1. Yield was 1090 g. of a tacky cyanoethylsiloxane copolymer. Added 27.25 g. of calcium stearate and 892 g. of methylethyl ketone to the tacky copolymer and stirred until a homogeneous solution was obtained. The resulting varnish had a 55% resin content and a 150° C. hot plate gel time of 493 seconds.

Example 4A

A mixture of 74 g. (0.57 moles) of dimethyldichlorosilane, 835 g. (5.6 moles) of methyltrichlorosilane, 506 g. (2.4 moles) of phenyltrichlorosilane and 538 g. (2.85 moles) of beta-cyanoethyltrichlorosilane was reacted in substantially the same manner as described in Example 3. The R:Si ratio was 1.05:1 and the R″CN:Si ratio was 0.25:1. Yield was 1010 g. of a clear, amber, grindable resin which analyzed for 3.76% nitrogen by weight. At 150° C. the cyanoethylsiloxane copolymer had an "as is" hot plate gel time of 121 seconds; when catalyzed with 2% calcium stearate the copolymer had a gel time of about 49 seconds at 150° C.

Example 4B

For comparison purposes a resin was produced having the same R:Si ratio of 1.05:1 but having a R″CN:Si ratio of 0. A mixture of 74 g. (0.57 moles) of dimethyldichlorosilane, 1262 g. (8.4 moles) of methyltrichlorosilane and 506 g. (2.4 moles) of phenyltrichlorosilane was prepared. One half of this organosilane mixture, 921 g., was added to a vigorously agitated mixture of 6000 ml. of isopropyl ether and 2100 ml. of water over a 1.75 hours period. External cooling and rate of addition were so regulated that the reaction temperature was always below about 50° C. After stirring for an additional 5 minutes the water layer, which contained about 20 to 25% by weight of hydrochloric acid, was removed and replaced with 1200 ml. of fresh water. Half of the remaining organosilane mixture, 460 g., was added over a 50 minute period at below 50° C. The water layer was again removed and again replaced with 1200 ml. fresh water. The remainder of the organosilane mixture, 461 g., was then added over a 50 minute period at below 50° C. The water layer was removed and the ether solution was washed with several 2500 ml. portions of water until its pH was about 5. Then a solution of 7.5 g. of triisopropanolamine in 7.5 g. of toluene was added to the ether solution, and the solvents were distilled off, first at atmospheric pressure to a pot temperature of 120° C. over a 1.5 hours period, then at gradually decreasing pressure, so that a residue temperature of 130° C. and a pressure of 50 mm. of mercury was reached in about 10 minutes. Yield was 940 g. of a faintly hazy grindable resin. At 150° C. the resin had an "as is" hot plate gel time of over 600 seconds; when catalyzed with 2% of ethylenediamine-formaldehyde adduct, the gel time was about 15 to 20 seconds, and when catalyzed with 2% by weight of calcium stearate, it was about 400 seconds.

*Example 5*

A mixture of 74 g. (0.57 mole) of dimethyldichlorosilane, 631 g. (4.2 moles) of methyltrichlorosilane, 506 g. (2.4 moles) of phenyltrichlorosilane and 795 g. (4.2 moles) of beta-cyanoethyltrichlorosilane was reacted in substantially the same manner as described in Example 3. The R:Si ratio was 1.05:1 and the R"CN:Si ratio was 0.37:1. Yield was 990 g. of a clear, amber, grindable cyanoethylsiloxane copolymer having a 5.27% nitrogen content. At 150° C. the copolymer had an "as is" hot plate gel time of over 600 seconds; and of 9 seconds when catalyzed with 2% ethylenediamine-formaldehyde adduct. At 165° C. the copolymer had a hot plate gel time of 80 seconds when catalyzed with 2% calcium stearate.

*Example 6*

A mixture of 74 g. (0.57 mole) of dimethyldichlorosilane, 631 g. (4.2 moles) of methyltrichlorosilane, 506 g. (2.4 moles) of phenyltrichlorosilane and 855 g. (4.2 moles) of gamma-cyanopropyltrichlorosilane was reacted in substantially the same manner as described in Example 3. The R:Si ratio was 1.05:1 and the R"CN:Si ratio was 0.37:1. Yield was 1090 g. of a clear, amber, grindable cyanopropylsiloxane copolymer having a 4.63% nitrogen content. At 150° C. the copolymer had an "as is" hot plate gel time of 240 seconds; when catalyzed with 2% by weight of ethylenediamine-formaldehyde adduct the gel time was about 13 seconds.

*Example 7*

A mixture of 309 g. (2.4 moles, of dimethyldichlorosilane, 359 g. (2.4 moles) of methyltrichlorosilane, 635 g. (3 moles) of phenyltrichlorosilane, 304 g. (1.2 moles) of diphenyldichlorosilane and 607 g. (3 moles) of gamma-cyanopropyltrichlorosilane was reacted in substantially the same manner as described in Example 3, with the exceptions that acetone was the solvent and that the addition was made over a 3.75 hours period. The R:Si ratio was 1.3:1 and the R"CN:Si ratio was 0.25:1. After distilling off the solvent, heating was discontinued and 575 g. of toluene was slowly added. The solution was allowed to cool to 80° C. and 115 g. of isopropanol was added. After complete solution was obtained, the reaction mass was cooled, and the product was discharged. Yield of cyanopropylsiloxane copolymer-containing varnish was 2000 g. The varnish had an acid number of 3.65 and a copolymer content of 67.9% by weight. At 150° C. the varnish had a gel time of 40 seconds when catalyzed with 0.03% of benzoyl peroxide and 0.02% of choline based on the weight of resin solids present.

*Example 8A*

A mixture of 39 g. (2.4 moles) of methyltrichlorosilane, 309 g. (2.4 moles) of dimethyldichlorosilane, 762 g. (3.6 moles) of phenyltrichlorosilane, 304 g. (1.2 moles) of diphenyldichlorosilane and 453 g. (2.4 moles) of beta-cyanoethyltrichlorosilane was slowly added below the surface of an agitated slurry of 3000 g. of sodium bicarbonate in 5000 g. of acetone having a water content of less than 1% by weight. The addition was made at such a rate that the reaction temperature was maintained at or below 30° C. The ratio of R:Si was 1.3:1 and the R"CN:Si ratio was 0.20:1. After all of the hydrolyzable organosilane mixture had been added, the reaction mixture was stirred for another 45 minutes; pH was 6.8. The reaction slurry was filtered to remove insoluble inorganic salts and the cake on the filter was washed with 1200 g. of acetone. The combined acetone filtrates were adjusted to a pH of 8 with triisopropanolamine and then the solvents were distilled off at atmospheric pressure to a reaction mass temperature of about 120° C. After 15 minutes at this temperature there was added 500 g. of toluene and the solution was refluxed at atmospheric pressure with the condensate passing through a water separator until all of the water had been removed. The cyanoethylsiloxane copolymer solution was cooled to about 80° C. and diluted with another 100 g. of toluene. Yield of varnish was 2100 g. having a copolymer solids content of 63.7% by weight. The nitrogen content of the copolymer was 2.5%. At 150° C. the varnish had a gel time of 22 seconds when catalyzed with 0.1% by weight of tetraethanolammonium hydroxide.

*Example 8B*

For comparison purposes a varnish was prepared having the same R:Si ratio of 1.3:1 but having an R"CN:Si ratio of 0. A mixture of 538 g. (3.6 moles) of methyltrichlorosilane, 309 g. (2.4 moles) of dimethyldichlorosilane, 1015 g. (4.8 moles) of phenyltrichlorosilane and 304 g. (1.2 moles) of diphenyldichlorosilane was reacted in substantially the same manner as described in Example 8A, with the exceptions that only 2,860 g. of sodium bicarbonate was used and that 100 g. of isopropanol was used as diluent instead of toluene after the water had been removed. Yield was 2000 g. of varnish having a resinous solids content of 65% by weight and a viscosity at 25° C. of 75 cst.

The cyanoalkylsiloxane copolymers described in Examples 1, 2, 4, 5, and 6 of this application were used to prepare the molding compositions described in Examples 9 through 13. These molding compositions were used to produce circular discs 4 inches in diameter and 1/8 inch thick by compression molding at 168° C. and 3000 p.s.i. for 5 minutes. The discs were ejected hot from the mold by means of four 3/8 inch diameter knockout pins located symmetrically at 90° intervals within the periphery of the base of the mold cavity. All of the discs prepared with the cyanoalkylsiloxane copolymers of this invention remained perfectly flat and undistorted, and did not show cracks of any nature. However, the discs prepared in the same manner from the conventional polysiloxane molding compositions of Examples 9B and 11B were broken and contained large cracks running radially inward from the point of contact with the knockout pins.

The same molding compositions were used to mold tube bases at 171° C. and a mold load of 6000 lbs. for 2.5 minutes. All of the tube bases molded with the conventional polysiloxane molding compositions of Examples 9B and 11B fractured as the mold was opened. Tube bases molded with the cyanoalkylsiloxane copolymers of this invention were prepared without difficulty and left the mold cavity cleanly and were easily removed undistorted from the mold force. In a few instances, tube bases prepared with the molding composition of Example 9A fractured as they were being removed from the mold. It appears that for molding intricate shapes an R"CN:Si ratio of at least about 0.2:1 is preferred to attain sufficient hot strength to permit hot-ejection from the mold; while for relatively simple moldings, as for example discs or bars, a ratio of at least about 0.1:1 will suffice.

Molded articles obtained from the cyanoalkylsiloxane copolymer molding composition of this invention showed average flexural strengths at 23° C. of about 6000 p.s.i. and at 200° C. of about 2,500 p.s.i. Flexural modulus was about $1.3 \times 10^6$ p.s.i. at 23° C. and about $4.5 \times 10^5$ p.s.i. at 200° C. The resistance to 5% aqueous sodium hydroxide solution at room temperature of molded articles produced from the cyanoalkylsiloxane copolymers of this invention was better than that of articles molded from conventional organopolysiloxane resin. After immersion for 48 hours, articles molded from the cyanoalkylsiloxane molding compositions of this invention still had a fairly good appearance; whereas, articles molded from conventional organopolysiloxane molding compositions had a poor appearance after immersion for only 24 hours.

The electrical properties of cured moldings prepared from cyanoalkylsiloxane copolymer molding compositions are compared to moldings prepared with conventional organopolysiloxane resine compositions in the following table:

|  | Cyanoalkylsiloxane Molding Copolymer Composition | Conventional Polysiloxane Resin Molding Composition |
|---|---|---|
| Arc resistance, Sec. | 53–230 | 47–300 |
| Power factor (1 kc.): |  |  |
| at 23° C. | 0.004–0.011 | 0.003–0.004 |
| after water immersion | 0.014–0.030 | 0.005–0.015 |
| at 200° C. | 0.17–0.81 | 0.008–0.021 |
| Dielectric constant (1 kc.): |  |  |
| at 23° C. | 4.9–7.3 | 4.6–5.2 |
| after water immersion | 5.7–9.1 | 5.2–5.8 |
| at 200° C. | 5.3–10.8 | 4.6–5.0 |

The cyanoalkylsiloxane copolymer molding compositions of this invention are faster curing than comparable conventional organopolysiloxane resins when cured under the same conditions. This may be illustrated by measurement of the apparent modulus of elasticity, which is carried out in the following manner:

A molded flexural bar (1″ x 5″ x ⅛″) was produced by curing the molding composition for 3 minutes at the indicated temperature. The bar, while being maintained at the molding temperature, was immediately loaded in flexure and the deflection recorded. The "Apparent Modulus of Elasticity" (E) was then calculated by means of the equation $$E = \frac{Fh^3}{4Dwt^3}$$

where F is the applied load in pounds, h is the length (in inches) of the span under stress, D the deflection (in inches), and w and t the width and thickness (in inches) of the bar, respectively.

Higher values of E indicate a greater degree of rigidity of the molded article; therefor, the article can better tolerate the forces required to eject it while still hot from the mold. Another indication of the improved strength and faster curing properties of the cyanoalkylsiloxane copolymers is the "green strength" or the strength required to break the hot piece in flexure at the molding temperature three seconds after it has been removed from the mold. Data illustrating values of E at various temperatures, and the "green strength" after curing for 3 minutes at 185° C. is listed below:

| Ex. No. | Ratio of R:Si | Ratio of R″ CN:Si | E in p.s.i. at— | | | "Green Strength", p.s.i. at 185° C. |
|---|---|---|---|---|---|---|
|  |  |  | 152° C. | 168° C. | 185° C. |  |
| 9B | 1.20 | 0.0 | 12,500 | 28,000 | 53,000 | 600 |
| 9A | 1.20 | 0.1 | 15,500 | 30,000 | 55,500 | 850 |
| 10 | 1.20 | 0.2 | 34,000 | 57,000 | 82,500 | 950 |

The varnishes which can be produced with the cyanoalkylsiloxane copolymers of this invention may be used as protective coatings and applied by the methods known to those familiar with the art. They can also be used in the preparation of laminated structures. In preparing laminates, a fibrous material, such as a cloth or mat of natural, synthetic or mineral fibers, is impregnated by passing the fibrous material through a catalyzed varnish solution of the cyanoalkylsiloxane copolymer. The resin is then dried thereon by controlled heating in an oven and a multiplicity of layers of the cloth or mat are then pressure and heat molded to form a laminated product. In preparing such laminates the same conditions as used for conventional organopolysiloxane resins can be used for curing. The resin content of the laminated article can be varied from about 30% to about 70% by weight based on the total weight of the finished laminate.

*Example 9A*

A mixture of 600 g. of the cyanoethylsiloxane copolymer of Example 1A, 3 g. of ethylenediamine-formaldehyde adduct, 20 g. of calcium stearate and 1,377 g. of glass fibers having an average length of about ⅛ inch was ball milled for about 15 minutes. The dry blend was fluxed on a two roll mill, which had a temperature of about 100° C. on the front roll and a temperature of about 125° C. on the back roll, and then milled for 90 seconds to a smooth sheet. The sheet was cooled and granulated to pass through a 6 mesh standard screen. The granulated molding composition was compression molded for 5 minutes at 168° C. and 3000 p.s.i. pressure in a positive mold into circular discs 4 inches in diameter and ⅛ inch thick. The discs were ejected hot from the mold by the action of four ⅜ inch diameter knockout pins located symmetrically at 90° intervals just within the periphery of the base of the mold cavity. All of the moldings cooled to hard, infusible, rigid, perfectly flat, undistorted discs without showing any signs of cracking. A rectangular bar 1 inch by 5 inches by ⅛ inch, which was compression molded for 3 minutes at 185° C. at a pressure of 3000 p.s.i., had a "green strength" of 850 p.s.i. when tested 3 seconds after molding. In addition tube bases were molded for 2.5 minutes at 171° C. under a total mold load of 6000 pounds. Occasionally the tube base broke as the mold was opened, with the threaded cylindrical wall section of the molding staying on the mold force and the perforated flat base and keyed lug sections remaining in the mold cavity. Such breakage occurred in about 3 out of 10 moldings. The apparent modulus of elasticity of the molding composition was determined after a 3 minutes cure at a pressure of 2000 p.s.i. on rectangular bars 1 inch by 5 inches by ⅝ inch, which had been cured at various temperatures, and was 15,500 p.s.i. at 152° C.; 30,000 p.s.i. at 168° C.; and 55,500 p.s.i. at 185° C.

*Example 9B*

For comparison purposes a similar molding composition was prepared in the same manner using 600 g. of the organopolysiloxane resin of Example 1B. This molding composition was used to prepare circular discs in the same manner as described in Example 9A. All of these discs fractured on ejection from the mold, i.e., contained large cracks running radially inward from the point of contact with the knockout pins. Tube bases were also molded as described in Example 9A; as the mold was opened these bases broke with the threaded cylindrical wall section of the moldings staying on the mold force and the perforated flat base and keyed lug section remaining in the mold cavity. The apparent modulus of elasticity after a 3 minutes cure was determined as described above and was 12,500 p.s.i. at 152° C.; 28,000 p.s.i. at 168° C.; and 53,000 p.s.i. at 185° C., and the "green strength" after molding for 3 minutes at 185° C. and 3000 p.s.i. was 600 p.s.i.

Additional molding compositions were prepared and molded as described in Example 9A. The compositions of these are listed below. None of the molded circular discs prepared with cyanoalkylsiloxane copolymer molding compositions of Examples 10, 11A, 12 and 13 showed any signs of cracking on hot-ejection from the mold. Neither was any cracking encountered when the molding compositions were used to prepare tube bases. In every instance the molded tube bases left the mold cavity cleanly and were easily removed undistorted from the mold force. However, the molding composition of 11B, which was prepared with a conventional polysiloxane, produced discs which cracked on ejection from the mold, and tube bases which broke when the mold was opened.

| Ex. | g. Resin | Source of Resin | g. EDF [1] | g. Calcium Stearate | g. Glass Fiber | Milling Period, sec. |
|---|---|---|---|---|---|---|
| 10 | 600 | Ex. 2 | 3.0 | 20 | 1,377 | 90 |
| 11A | 600 | Ex. 4A | | 20 | 1,380 | 90 |
| 11B | 600 | Ex. 4B | | 20 | 1,380 | 90 |
| 12 | 600 | Ex. 5 | | 20 | 1,380 | 90 |
| 13 | 600 | Ex. 6 | | 20 | 1,380 | 300 |

[1] Ethylenediamine-formaldehyde adduct.

The molding composition of Example 10 was also used to prepare rectangular bars 1 inch by 5 inches by ⅛ inch. The apparent modulus of elasticity at various temperature after a 3 minute cure was determined and found to be 34,000 p.s.i. at 152° C.; 57,000 p.s.i. at 168° C.; and 82,500 p.s.i. at 185° C.; the "green strength" after curing 3 minutes at 3000 p.s.i. and 185° C. was 950 p.s.i.

*Example 14A*

The cyanoalkylsiloxane copolymer varnish of Example 8A was diluted to 55% solids with toluene and catalyzed with 0.03% of benzoyl peroxide and 0.04% of choline, both based on the weight of copolymer. The resulting varnish had a 150° C. hot plate gel time of about 62 seconds. This varnish was charged to the pan of a laboratory treater and a 13 inch wide roll of neutral pH glass cloth (United Merchants #112) was then passed through the varnish and through a 30 feet long drying oven at a rate of 6 feet per minute. The oven's three zones, from wet end to dry end, were set at 90°, 120° and 110° C., respectively. The dry treated cloth contained 38% resin by weight. Twelve inch squares were cut and a laminated panel approximately ⅛ inch thick was prepared by laminating 40 of these squares together for about ½ hour at 160° C. under a pressure of 1000 p.s.i. and then post curing the panel for 16 hours at 80° C., 1 hour at 100° C., 1 hour at 150° C., 2 hours at 200° C. and finally 4 hours at 250° C. The panel had the following properties.

Flexural strength:
  At room temperature _____p.s.i__ 34,000
  At 200° C. _____p.s.i__ 10,000
Dielectric strength: parallel to lamination__kv_ 42–47
Arc resistance: after 48 hrs. immersion in distilled water at 50° C. _____sec__ 139–185
Water absorption: 24 hr. immersion at 23° C., by weight _____percent__ 0.07

*Example 14B*

A similar laminated panel was prepared using the organopolysiloxane varnish of Example 8B. This laminate had the following properties.

Flexural strength:
  At room temperature_____p.s.i__ 28–34,000
  At 200° C. _____p.s.i__ 9–10,000
Dielectric strength: parallel to lamination _____kv__ 50–60
Arc resistance: after 48 hrs. immersion in distilled water at 50° C. _____sec__ 180–200
Water absorption: 24 hrs. immersion at 23° C., by weight _____percent__ 0.03–006.

What is claimed is:

1. Cyanoalkylsiloxane copolymers comprising chemically combined structural units which are represented by the formulae:

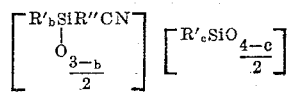

wherein R' is a monovalent hydrocarbon radical; R" represents an alkylene radical containing from 2 to about 5 carbon atoms; b is an integer having a value of 0 and 1; and c is an integer having a value from 0 to 3, wherein the average molar ratio of R"CN:Si is from about 0.1:1 to about 0.6:1 and wherein the average molar ratio of the sum of R' plus R"CN:Si is from about 0.95:1 to about 1.5:1.

2. Cyanoalkylsiloxane copolymers comprising chemically combined structural units which are represented by the formulae:

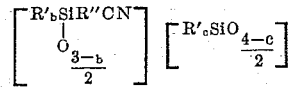

wherein R' is a monovalent hydrocarbon radical; R" represents an alkylene radical containing from 2 to about 5 carbon atoms; b is an integer having a value of 0 and 1; and c is an integer having a value of from 0 to 3, wherein the average molar ratio of R"CN:Si is from about 0.15:1 to about 0.45:1 and wherein the average molar ratio of the sum of R' plus R"CN:Si is from about 1:1 to about 1.25:1.

3. Cyanoalkylsiloxane copolymers comprising chemically combined structural units which are represented by the formulae:

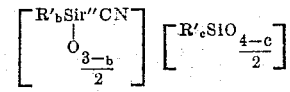

wherein R' is a monovalent hydrocarbon radical; R" represents an alkylene radical containing from 2 to about 5 carbon atoms; b is an integer having a value of 0 and 1; and c is an integer having a value of from 0 to 3, wherein the average molar ratio of R"CN:Si is from about 0.15:1 to about 0.45:1 and wherein the average molar ratio of the sum of R' plus R"CN:Si is from about 1.15:1 to about 1.35:1.

4. A cyanoalkylsiloxane molding composition comprising from about 20 to about 50 parts by weight of the cyanoalkylsiloxane copolymers claimed in claim 1 with from about 50 to about 80 parts by weight of filler, per 100 parts of molding composition.

5. A cyanoalkylsiloxane molding composition comprising from about 20 to about 50 parts by weight of the cyanoalkylsiloxane copolymers claimed in claim 1 with from 50 to about 80 parts by weight of filler, from about 0.1 to about 2 parts by weight of accelerator, and from about 0.5 to about 3 parts by weight of lubricant, per 100 parts of molding composition.

6. A cyanoalkylsiloxane varnish composition comprising from about 30 to about 75 parts by weight of the cyanoalkylsiloxane copolymers claimed in claim 1 with from about 25 to about 70 parts by weight of an organic solvent, which is a solvent for said cyanoalkylsiloxane copolymers, per 100 parts of varnish.

7. A cyanoalkylsiloxane varnish composition comprising from about 30 to about 75 parts by weight of the cyanoalkylsiloxane copolymers claimed in claim 2 with from about 25 to about 70 parts by weight of an organic solvent, which is a solvent for said cyanoalkylsiloxane copolymers, per 100 parts of varnish.

8. A laminated structure comprising a multiplicity of layers of fibrous material impregnated with the cyanoalkylsiloxane copolymers claimed in claim 1; said structure being infusible, insoluble and rigid.

9. A molded product produced by heating the molding composition of claim 4 under pressure to cure the composition.

10. The copolymers of claim 1 wherein R"CN is a beta-cyanoethyl group.

11. The copolymers of claim 1 wherein R"CN is a gamma-cyanopropyl group.

12. The copolymers of claim 1 wherein R' is a member selected from the group consisting of the phenyl and methyl groups.

13. The copolymers of claim 10 wherein R' is a member selected from the group consisting of the phenyl and methyl groups.

14. The copolymers of claim 11 wherein R' is a member selected from the group consisting of the phenyl and methyl groups.

References Cited in the file of this patent

UNITED STATES PATENTS

| | | |
|---|---|---|
| 2,652,385 | Hunter et al. | Sept. 15, 1953 |
| 2,901,460 | Boldebuck | Aug. 25, 1959 |

FOREIGN PATENTS

| | | |
|---|---|---|
| 1,116,725 | France | Feb. 6, 1956 |
| 1,116,726 | France | Feb. 6, 1956 |
| 786,020 | Great Britain | Nov. 6, 1957 |